United States Patent [19]

Delfrate et al.

[11] 3,748,602

[45] July 24, 1973

[54] DETERMINATION OF EQUALIZER SETTING IN TELECOMMUNICATION SYSTEM

[75] Inventors: Egidio Alvazzi Delfrate; Giuliano De Nicolay, both of Milan, Italy

[73] Assignee: Societa Italiana Telecommunicazioni Siemens S.p.A., Milan, Italy

[22] Filed: June 8, 1972

[21] Appl. No.: 260,722

[30] Foreign Application Priority Data

June 11, 1971 Italy ............................ 25718 A/71

[52] U.S. Cl. ............... 333/28 R, 324/57 R, 333/16, 333/18

[51] Int. Cl. ........ H04b 3/04, H04b 3/10, H04b 3/14

[58] Field of Search ....................... 333/18, 28 R, 16; 325/65

[56] References Cited

UNITED STATES PATENTS

| | | | |
|---|---|---|---|
| 2,607,851 | 8/1952 | Pfleger | 333/16 |
| 3,663,898 | 5/1972 | Kao et al. | 333/18 |

*Primary Examiner*—Paul L. Gensler
*Attorney*—Karl F. Ross

[57] ABSTRACT

A wide-band equalizer for a telecommunication system includes a symmetrical corrector and an asymmetrical corrector, each encompassing the entire band, and a multiplicity of parallel corrective networks centered on the midfrequencies of respective sub-bands. A set of input registers, one for each sub-band, serve for the storage of error voltages representative of the deviations of the signal levels in the equalizer output from predetermined reference values as required under certain (e.g., seasonally variable) operating conditions. A correction simulator, switchable between a symmetrical and an asymmetrical position, generates a group of compensating voltages representing the effect of either of the two overall correctors upon the signal amplitudes in different zones of the band; a group of summing circuits differentially combine these compensating voltages with the stored error voltages relating to the same band zones to provide a composite voltage which is read on an indicator and is minimized by adjustment of the two overall correctors. Thereafter, modified error voltages representing the residual deviations are fed into the input registers and thence to a resistance matrix distributing them to a multiplicity of output terminals, assigned to the several midfrequencies, with a polarity and step-down ratio corresponding to the effects of each corrective network upon the respective midfrequencies; a selector switch provides a reading of the cumulative effect of all the corrective networks upon each midfrequency, with the aid of a further summing circuit, as a basis for an individual readjustment of these networks.

12 Claims, 7 Drawing Figures

DETERMINATION OF EQUALIZER SETTING IN TELECOMMUNICATION SYSTEM

Our present invention relates to a method of and means for determining the setting of an equalizer used in a wide-band signaling system, e.g., a system for the transmission of a multiplicity of voice channels of respective carriers by way of a co-axial cable.

In commonly owned application Ser. No. 244,719, filed Apr. 17, 1972 by one of us (E. A. Delfrate), there has been disclosed an equalizer for this purpose which includes a multiplicity of corrective networks connected in parallel between a first coupler of low output impedance and a second coupler of low input impedance, these corrective networks being adjustably tuned to give passage to respective sub-bands whose midfrequencies are advantageously selected among the so-called interstitial frequencies lying in the zones between adjoining channels or channel groups.

The networks referred to, which may each include a band-pass filter whose pass band substantially coincides with the respective sub-band assigned to it, ideally control only the signal frequencies of the assigned sub-bands. Actually, however, each network also has a not insignificant effect upon adjoining sub-bands and, theoretically at least, upon the entire signal band.

Such an equalizer may be employed either at the transmitting end of a telecommunication path or further downstream along that path and may have to be readjusted from time to time in order to compensate for actual or anticipated changes in the tranmission characteristics of the path, e.g., on account of seasonal variations. As a result of these changes, the gain or attenuation introduced by the equalizer in one or more sub-bands may deviate in a positive or negative sense from its optimum value, such deviation being readily determinable by comparing the output level of the equalizer at a selected frequency with a predetermined magnitude established empirically or through calculation. An experienced operator can make the requisite readjustment directly from a reading of these deviations, yet the results of such adjustment are not invariably satisfactory inasmuch as they necessarily reflect the judgment of the person in charge.

It is, therefore, the general object of our invention to provide a method of and means for more accurately guiding an operator engaged in the calibration of such an equalizer.

Frequently, the equalizer also includes one or more correctors encompassing the entire band, i.e., units with a significant effect upon the attentuation or gain of all the sub-bands. Such an overall corrector may have an operating range bounded by two pilot frequencies below and above the signal band, with zero effect at these pilot frequencies and with a substantially symmetrical characteristic therebetween; alternatively, it may have an asymmetrical characteristic going to zero at one pilot frequency (e.g., the upper one) and progressively deviating from the zero axis all the way to the other pilot frequency. If the output of a symmetrical corrector is proportionally adjustable, its adjustment will result in a family of characteristics with a roughly parabolic (or, more precisely, Gaussian) shape within the signal band; a similar adjustment of an asymmetrical corrector yields a family of curves which are almost rectilinear within the signal band and in their totality resemble a fan. In many instances, a symmetrical and an asymmetrical section are combined in such an overall corrector, either serially or in parallel; the overall corrector may also be cascaded with the set of corrective networks for the several sub-bands or may lie in parallel therewith.

Since the presence of such an overall corrector complicates the calibration of the equalizer as a whole, it is a more particular object of our invention to provide a method of and means for facilitating the readjustment of such a composite equalizer.

In accordance with this invention we provide a multiplicity of input registers respectively assigned to the $n$ sub-band-correcting networks of the equalizer, each of these networks storing an error voltage $V_1$ – $V_n$ (generally designated $V_i$) representative of the deviation $\lambda_i$ of the signal level at the corresponding midfrequency $f_i$ in the equalizer output from a predetermined reference value. The error voltage $V_i$ so stored on each register is then multiplied with a plurality of proportionality factors $k_{1j} - k_{nj}$ each representative in sign and in magnitude of the effect of the corresponding ($i^{th}$) network upon a respective ($j^{th}$) midfrequency; all the error voltages so multiplied (generically designated $k_{ij}V_i$) are then additively combined on a corresponding ($j^{th}$) output terminal whose potential is measured as a basis for an individual readjustment of the corrective networks.

Such a readjustment can be readily carried out with the aid of a computer to which the combined voltages $$\sum_{1i}^{n} k_{ij} V_i$$

of the $n$ output terminals are simultaneously fed; alternatively, albeit somewhat more laboriously, each network is adjusted to compensate for the combined output voltage appearing on its assigned ($j^{th}$) terminal whereupon the procedure is repeated until these output voltages substantially disappear.

If the equalizer includes an overall corrector as described above, we prefer to readjust the latter ahead of the individual networks upon measuring the deviations $\lambda_1 - \lambda_n$ in the equalizer output and loading the registers with the group of corresponding error voltages $V_1 - V_n$; these stored voltages are then compared with several compensating voltages $D_1$ – $D_m$ generated by a unit which simulates the effect of the corrector upon respective zones of the signal band represented by the compensating voltages. These zones may coincide with the several sub-bands in which case $n = m$; in a simplified system, however, the number $m$ of such zones is a fraction (e.g., four) of the number $n$ (e.g., 12) of sub-bands (and registers) so that comparison to be carried out between the compensating voltages and respective subgroups of error voltages. The voltages of each such subgroup are additively combined with or without step-down so as to give their average value or a multiple thereof. Advantageously, pursuant to a further feature of our invention, the simulator is switchable to generate compensating voltages of different relative magnitudes consistent with the characteristics of different correctors used in the equalizer, e.g., a symmetrical section and an asymmetrical section as discussed above.

The above and other features of our invention will be described in detail hereinafter with reference to the accompanying drawing in which:

FIG. 1 is a block diagram of an equalizer to which our present invention is applicable;

FIG. 2$a$, 2$b$ and 2$c$ are graphs representing the characteristics of several correctors included in the equalizer of FIG. 1;

Figure 1:
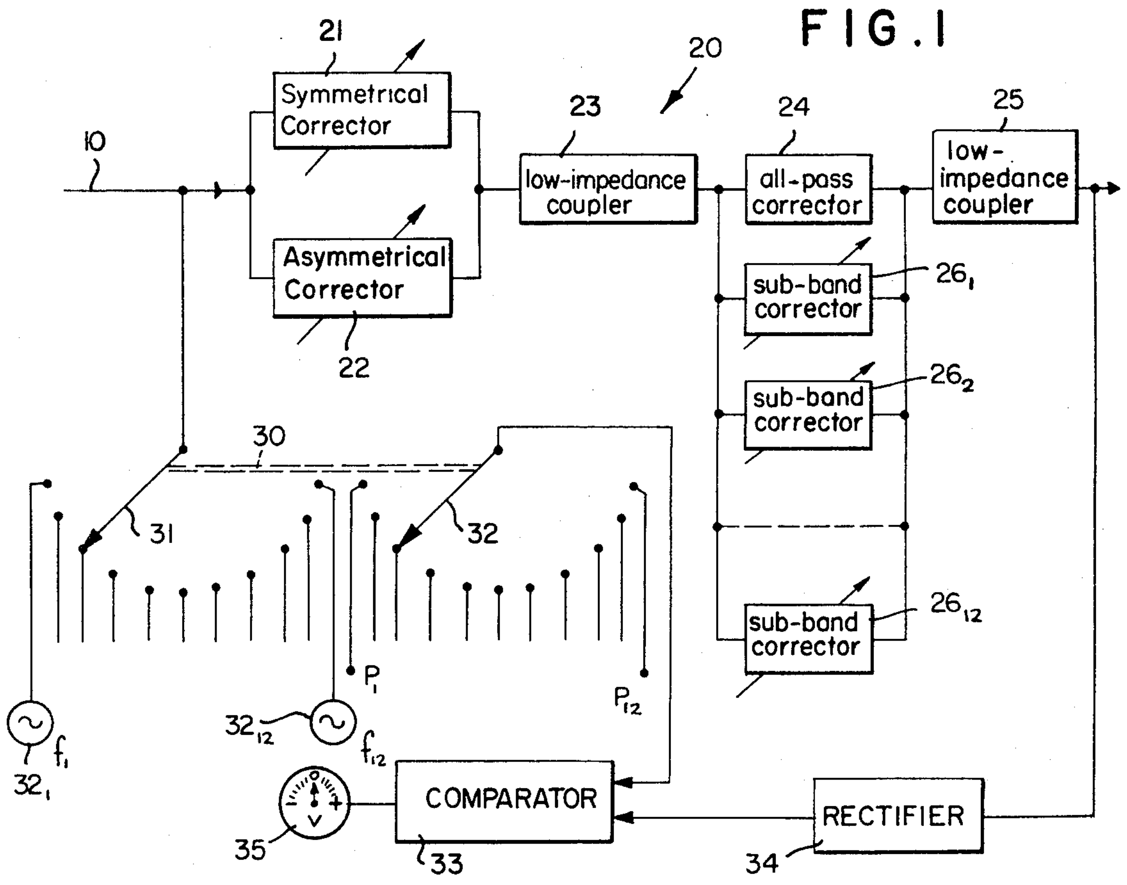

In FIG. 1 we have shown a transmission path 10 for a wide band of signal frequencies passing through an equalizer 20. The equalizer comprises a corrector 21 with a symmetrical characteristic, a corrector 22 with an asymmetrical characteristic in parallel therewith, a low-impedance coupler 23 in cascade with these two correctors, an all-pass network 24 downstream of coupler 23, and a further low-impedance coupler 25 following network 24. A set of 12 corrective networks $26_1, 26_2, \ldots 26_{12}$ lie in parallel with all-pass network 24 to control respective sub-bands of the overall signal band.

A conventional test circuit, designed to determine the performance of the equalizer 20 at any of 12 different frequencies $f_1 - f_{12}$, is connected across a portion of path 10 including the equalizer. This test circuit comprises a selector switch 30 with two ganged switch arms 31, 32 each sweeping a set of 12 bank contacts, the contacts of arm 31 being connected to the outputs of respective oscillators $32_1 - 32_{12}$ whereas the contacts of arm 32 are tied to respective sources of reference potential $P_1 - P_{12}$. A comparator 33 has one input tied to switch arm 32 and another input connected, through a rectifier 34, to the output of coupler 25; comparator 33 works into an indicator 35 here shown as a voltmeter with balanced output giving both positive and negative readings.

Figure 3:
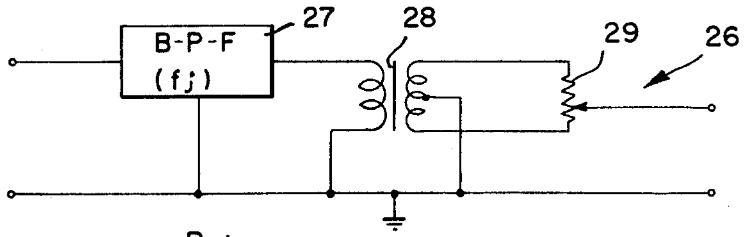
FIG. 3 is a circuit diagram of a typical corrective network as described in prior application Ser. No. 244,719.

Each of the corrective networks $26_1 - 26_{12}$, generically designated 26 in FIG. 3, comprises a band-pass filter 27 centered on a frequency $f_j$ which is one of the several frequencies $f_1 - f_{12}$ emanating from oscillators $32_1 - 32_{12}$ in FIG. 1. Filter 27 is sufficiently damped to have a transmission characteristic (admittance as a function of frequency) of generally Gaussian configuration within a range of frequencies centered on its mid-frequency $f_j$, as illustrated in FIG. 2$c$. The filter output is delivered by a transformer 28 to a potentiometer 29 whise slider is shiftable to vary the amplitude and the sign of the network output (but not the basic shape of its characteristic, i.e., the ratio of its ordinates throughout the frequency band) between a positive and a negative maximum.

Symmetrical corrector 21, whose transmission characteristic has been illustrated in FIG. 2$a$, may be of the same general structure as network 26 with a midfrequency shown at $f_o$. It will be noted that the family of curves illustrated in FIG. 2$a$ are of a shape resembling the moment line of a supported beam, anchored to a lower pilot frequency $f'$ and an upper pilot frequency $f''$ at which these curves go to zero and between which lies the signal band divided into 12 sub-bands with midfrequencies $f_1 - f_{12}$.

FIG. 2$b$ shows a corresponding family of curves for the asymmetrical corrector 22, anchored to the upper pilot frequency $f''$ but spreading out toward the lower pilot frequency $f'$.

Figure 4:
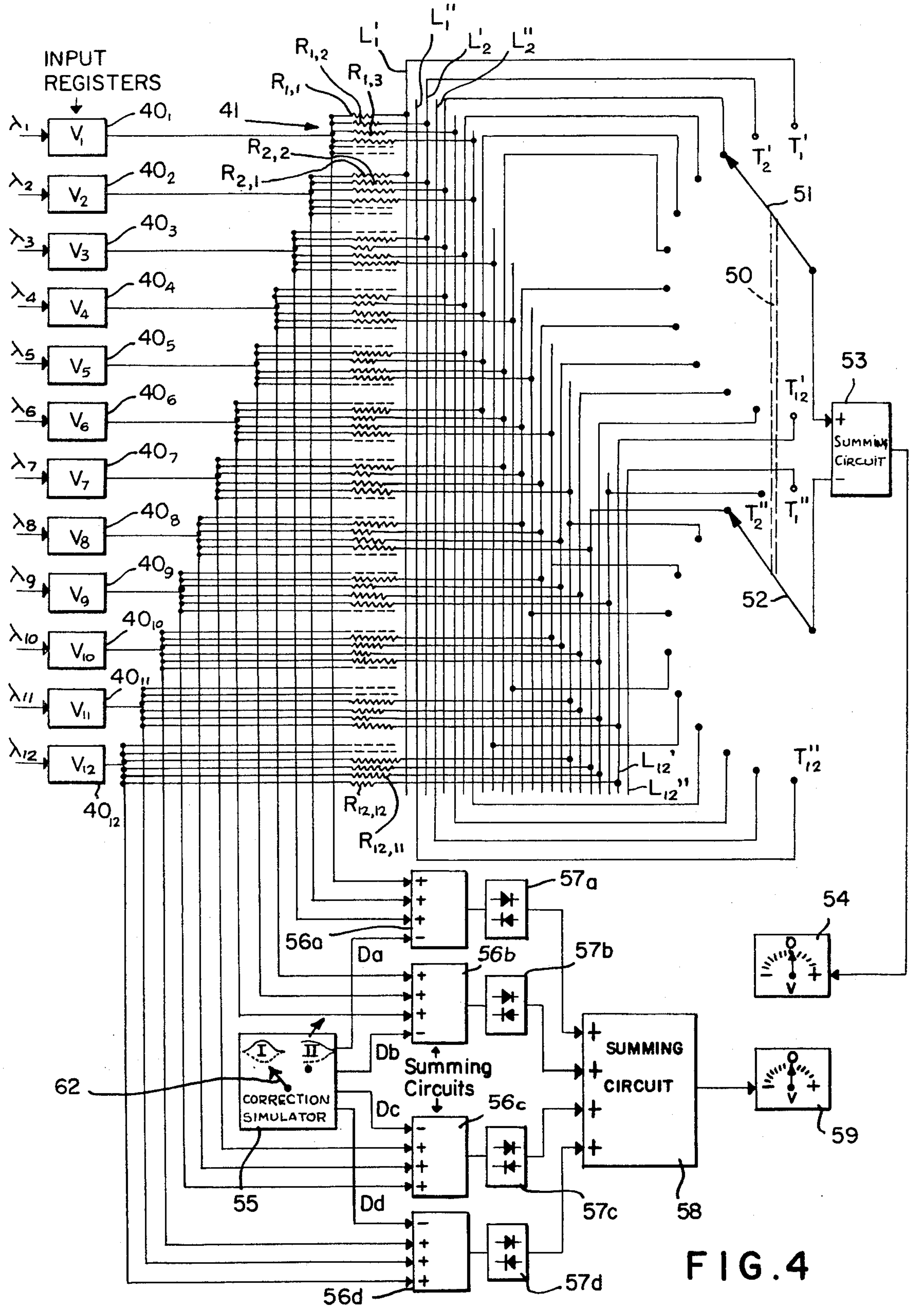
FIG. 4 is a circuit diagram of a calibrator designed to facilitate the adjustment of the equalizer of FIG. 1 in accordance with our invention.

Reference will now be made to FIG. 4 in which we have shown a calibrator serving to facilitate the adjustment of correctors 21, 22 and 26 in response to altered transmitting conditions. The calibrator includes a group of input registers $40_1 - 40_{12}$ working into a resistance matrix 41, this matrix comprising a multiplicity of resistors $R_{1,1}, R_{1,2} \ldots$ connected to register $40_1$, resistors $R_{2,1}, R_{2,2} \ldots$ connected to register $40_2$, and so forth, the resistors served by the last register $40_{12}$ being designated $\ldots, R_{12,11}, R_{12,12}$. Each resistor with the second subscript "1" is connected to either of two paired leads $L_1', L_1''$; a similar conductor pair $L_2', L_2''$ is provided for the resistors whose second subscript is "2," and so forth to a final pair $L_{12}', L_{12}''$ for the resistors having the second subscript "12." All the single-primed conductors $L_1', L_2' \ldots L_{12}'$ are connected to respective terminals $T_1', T_2', \ldots T_{12}'$ swept by a switch arm 51 forming part of a selector switch 50. Another switch arm 52, ganged with arm 51, sweeps corresponding terminals $T_1'', T_2'' \ldots T_{12}''$ connected in an analogous manner to the double-primed conductors $L_1'', L_2'' \ldots L_{12}''$. Switch arms 51 and 52 are respectively connected to an additive and a subtractive input of a summing circuit 53 in which the voltages appearing on these terminals are differentially combined; the output of stage 53 is fed to a voltmeter 54 similar to voltmeter 35 of FIG. 1. The magnitudes of the resistors of matrix 41 served by any input register, such as the resistors $R_{1,1}, R_{1,2}$, etc., associated with register $40_1$, bear a relationship which is the reciprocal of the ratio of the ordinates of the characteristic of the corresponding corrective network, such as the network $26_1$, for the respective midfrequencies $f_1, f_2$ etc. Thus, curve $c_1$ of FIG. 2$c$ shows a large amplitude $A_{1,1}$ (and therefore a low network impedance) for frequency $f_1$, a somewhat smaller amplitude $A_{1,2}$ for frequency $f_2$, a still smaller amplitude $A_{1,3}$ for frequency $f_3$, and so forth; this corresponds to a low value for resistor $R_{1,1}$, a higher value for resistor $R_{1,2}$, a still higher value for resistor $R_{1,3}$, and so forth. Some of these resistances, relating to frequencies remote from the midfrequency of the associated network, would be so high as to be practically infinite and may therefore be replaced by an open circuit, i.e., the absence of any connection between the register output and the corresponding conductor pair.

The registers $40_1 - 40_{12}$ comprise potentiometers producing error voltages $V_1 - V_{12}$ which are proportional to the deviations in signal level $\lambda_1 - \lambda_{12}$ read on voltmeter 35 of FIG. 1 in different positions of switch 30. In the manually controlled calibrator here considered, these deviations are translated by the operator into respective displacements of a control member for the potentiometer of the register, e.g. a knob which is turned through an angle $\alpha_i = \lambda_i d_i$ where $d_i$ is a proportionality factor. It may be assumed, in first approximation, that the magnitude of the increment $\delta V_i$ of the error voltage produced thereby is independent of the initial potentiometer setting; thus, the equalizer 20 of FIG. 1 may be readjusted by starting in the position of previous adjustment of the networks $26_1 - 26_{12}$.

Figures 2A, 2B, 2C:
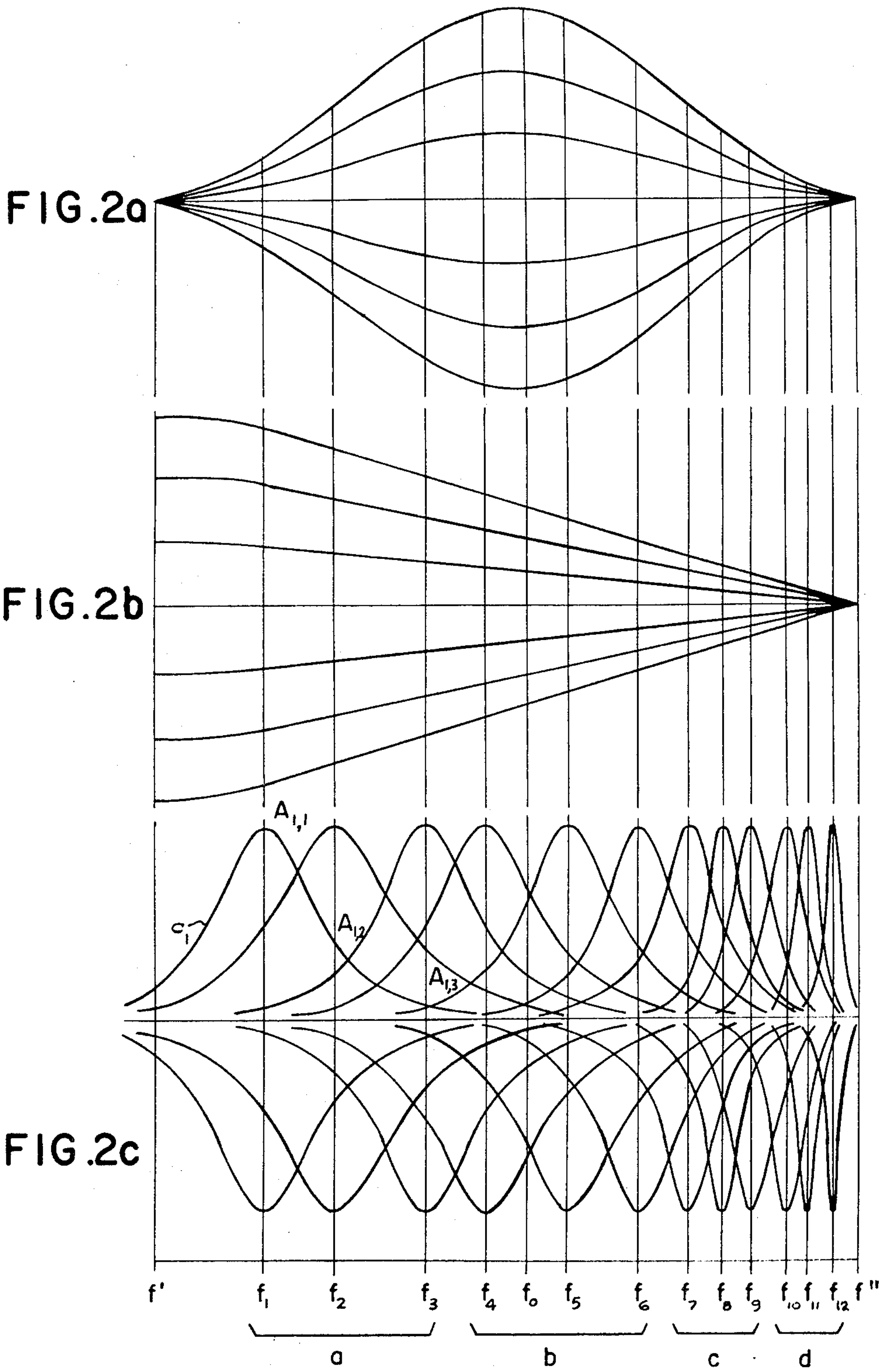

The potentiometers of input registers $40_1 - 40_{12}$ should be balanced so as to deliver voltages of opposite polarities when their slider is moved past a midpoint. Though all the resistors fed by a given input register are energized with the same polarity, the connection of some of these resistors to a double-primed conductor reverses the sign of the voltage components supplied by them to the arithmetic stage 53. This reversal, while not apparent from FIG. 2*c*, is needed for frequencies which pass a given network 26 with a phase shift of more than 90° (as compared with the output of the all-pass network 24) so that the contribution of network 26 to the signal amplitude at that frequency is negative rather than positive.

FIG. 4 further shows a correction simulator 55 whose four outputs carry compensating voltages $D_a$, $D_b$, $D_c$ and $D_d$. these voltages simulate the deviation-compensating effect of corrector 21 or 22 in four zones *a, b, c, d* (FIG. 2c) of the signal band. Zone *a* encompasses the three sub-bands centered on frequencies $f_1$, $f_2$ and $f_3$ (i.e., a range including the lowest 3½ channels of the 13 channels separated by the 12 interstitial frequencies $f_1 f_{12}$); voltage $D_a$, therefore, is fed to a subtractive input of a summing circuit **56*a* whose three additive inputs receive error voltages $V_1$, $V_2$ and $V_3$ from registers $\mathbf{40_1}$ – $\mathbf{40_3}$. In an analogous manner, a summing circuit 56*b*** receives on its additive inputs the error voltages $V_4$, $V_5$ and $V_6$ of the registers $\mathbf{40_4}$ – $\mathbf{40_6}$ assigned to frequencies in zone *b*, its subtractive input being fed the voltage $D_b$ from simulator 55. A third summing circuit **56*c*** recieves the error voltages $V_7$, $V_8$ and $V_9$ from the registers assigned to zone *c* as well as the voltage $D_c$ from simulator 55. Finally, the remaining error voltages $V_{10}$, $V_{11}$ and $V_{12}$ relating to zone *d* are supplied to a summing circuit *d* together with the compensating voltage $D_d$ from the simulator.

The four summing circuits **56*a* – 56*d* work through respective rectifiers 57*a*, 57*b*, 57*c*, 57*d* into four additive inputs of a further summing circuit 58 whose output drives an indicator 59 generally similar to indicators 35 and 54. The reading of indicator 54 thus represents a measure of the cumulative equalization error, distributed throughout the signal band, which is to be roughly compensated by a resetting of correctors 21, 22** and more precisely balanced by the individual adjustment of networks $\mathbf{26_1}$ – $\mathbf{26_{12}}$.

Figure 5:
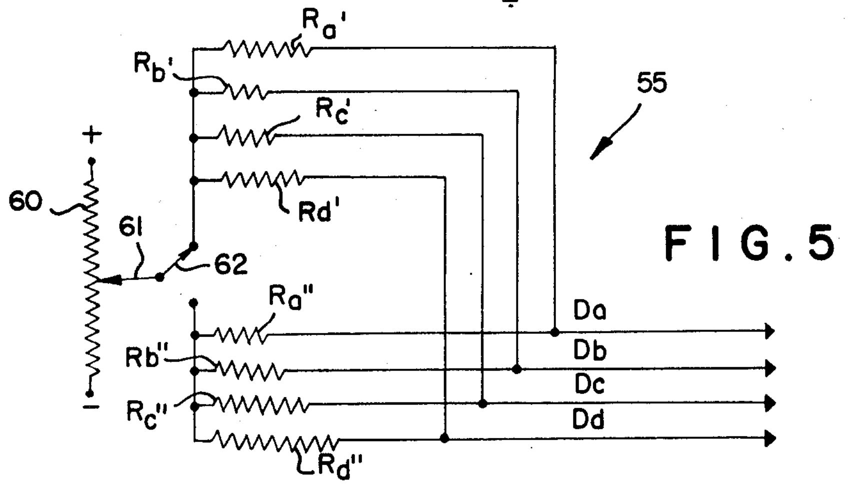
FIG. 5 is a circuit diagram of a simulator included in the calibrator of FIG. 4.

Simulator 55 is adjustable, like correctors 21 and 22, to vary the absolute magnitude and the sign but not the relative ratio of its output voltages $D_a$ – $D_d$. Details of this simulator have been illustrated in FIG. 5 which shows two resistance matrices $R_a'$, $R_b'$, $R_c'$, $R_d'$ and $R_a''$, $R_b'$, $R_c''$, $R_d''$. A balanced potentiometer 60 has a slider 61 alternatively connectable, via a switchover contact 62 also shown in FIG. 4, to either of these resistance matrices. On being thus connected,resistor $R_a'$ (or $R_a''$) develops the compensating voltage $D_a$ across an input resistance of adder 58, resistor $R_b'$ (or $R_b''$) delivers the compensating voltage $D_b$, and so on.

Thus, contact 62 may be placed either in a position I (FIG. 4) to simulate the characteristic of corrector 21 (FIG. 2*a*) or in a position II to simulate that of corrector 22 (FIG. 2*b*).

In resetting the equalizer 20 of FIG. 1, the operator first takes a reading of instrument 35 in the 12 different positions of switch 30 to ascertain the deviations $\lambda_1$ – $\lambda_{12}$ which are thereupon stored in registers $\mathbf{40_1}$ – $\mathbf{40_{12}}$ in the form of error voltages $V_1$ – $V_{12}$. (It will be understood that such storage could also be carried out automatically, with the aid of a suitable servocircuit, in the several switch positions.) Next, with switchover contact 62 in position I, corrector 21 is reset until indicator 59 gives a minimum reading. This process is then repeated with contact 62 in position II to reduce the output signal still further by manipulating the corrector 22. Naturally, these two adjustments could also be carried out in the reverse order.

Next, the operator again takes the readings of instrument 35 in the several positions of switch 30 and correspondingly modifies the voltages stored in registers $\mathbf{40_1}$ – $\mathbf{40_{12}}$. He thereafter steps the selector switch 50 through its 12 positions, taking the readings of indicator 54. These readings can then be fed into a computer which determines the individual readjustment necessary for each corrective network $\mathbf{26_1}$ – $\mathbf{26_{12}}$; as already noted, it is also possible to use each of these readings for resetting the corresponding corrective network, yet this will generally not lead right away to a satisfactory equalization inasmuch as the resetting of any one network to zeroize the meter 54 in one position of switch 50 also influences the readings of meter 54 in other switch positions; such a procedure, therefore, will usually have to be repeated several times until meter 54 no longer indicates substantial deviations from zero in any position of switch 50.

It will be apparent that the correctors 21 and 22 could also be disposed in parallel with networks $\mathbf{26_1}$ – $\mathbf{26_{12}}$, in place of or alongside network 24, and that further corrector sections of this nature but of different characteristic may be added if simulator 55 is suitably modified.

We claim:

1. A method of determining the setting of an equalizer including a multiplicity of proportionally adjustable corrective networks with substantially Gaussian characteristics centered on the midfrequencies of respective sub-bands of a band of singal frequencies to be transmitted over a telecommunication path, comprising the steps of:

storing, on a multiplicity of registers respectively assigned to said networks, a group of error voltages representative of deviations of signal levels at the corresponding midfrequencies in the equalizer output from predetermined reference values;

multiplying the input voltage stored on each register with a plurality of proportionality factors each representative in sign and in magnitude of the effect of the corresponding network upon a respective midfrequency;

additively combining, on a multiplicity of terminals respectively assigned to said midfrequencies, the error voltages from all said registers as multiplied by the corresponding proportionality factors; and measuring the additively combined voltage on each terminal as a basis for an individual readjustment of said corrective networks.

2. A method as defined in claim 1 wherein the equalizer also includes a proportionally adjustable overall corrector exerting a significant effect upon the signal level of the entire band, comprising the further step of subtractively combining the error voltages stored on said registers with compensating voltages, each representative in sign and in magnitude of the effect of said overall corrector upon respective portions of the band, and measuring the resulting voltage as a basis for readjustment of said overall corrector and consequent modification of the stored error voltages prior to measuring the additively combined voltages on said terminals.

3. A method as defined in claim 2 wherein said overall corrector includes a plurality of separately adjustable sections with different characteristics, comprising the further step of modifying said compensating voltages in conformity with the characteristics of respective sections and indiviudally read-adjusting each section on the basis of said resulting voltage as obtained from a corresponding set of compensating voltages.

4. A method as defined in claim 2 wherein the number of said compensating voltages is a fraction of the number of said error voltages, the latter being additively combined in a number of subgroups equal to the number of compensating voltages upon being differentially combined with the latter.

5. A system for determining the setting of an equalizer including a multiplicity of proportionally adjustable corrective networks with substantially Gaussian characteristics centered on the midfrequencies of respective sub-bands of a band of signal frequencies to be transmitted over a telecommunication path comprising:

a multiplicity of input registers respectively assigned to said networks and connected to receive a group of error voltages representative of deviations of signal levels at corresponding midfrequencies in the equalizer output from predetermined reference values;

circuitry connected to said registers for multiplying each stored error voltage with a plurality of proportionality factors each representative in sign and in magnitude of the effect of the corresponding network upon a respective midfrequency;

a multiplicity of output terminals respectively assigned to said midfrequencies, said circuitry being connected to each of said output terminals for developing thereon an additive combination of the error voltages from all said registers as multiplied by the corresponding proportionality factors; and indicator means selectively connectable to said output terminals for determining the magnitudes of the combined voltages thereon as a basis for a readjustment of said corrective networks.

6. A system as defined in claim 5 wherein said circuitry comprises a resistance matrix.

7. A system as defined in claim 6 wherein said circuitry further comprises a multiplicity of conductor pairs, one for each register, said output terminals being divided into two sets connected to respective conductors of each pair, said indicator means including an arithmetic stage with an additive input connectable to the terminals of one set and a subtractive input connectable to the terminals of the other set.

8. A system as defined in claim 7, further comprising a pair of ganged selector switches between said sets of terminals and said additive and subtractive inputs, respectively.

9. A system as defined in claim 5, wherein the equalizer also includes a proportionally adjustable overall corrector exerting a significant effect upon the signal level of the entire band, further comprising a proportionally adjustable simulator generating a plurality of compensating voltages each representative in sign and in magnitude of the effect of said overall corrector upon respective portions of the band, summing means connected to said registers and to said simulator for subtractively combining said error voltages with corresponding compensating voltages, and output means giving a reading of a resulting voltage from said summing means as a basis for readjustment of said overall corrector and consequent modification of the error voltages stored on said registers.

10. A system as defined in claim 9 wherein said simulator generates a number of compensating voltages equal to a fraction of the number of said registers, said summing means including a plurality of summing circuits, one for each compensating voltage, each connected to a respective subgroup of said registers for additively combining the error voltages stored thereon while subtracting therefrom a respective compensating voltage, said output means comprising an adder for the combined voltages of all said summing circuits.

11. A system as defined in claim 9 wherein said overall corrector includes a plurality of separately adjustable sections with different characteristics, said simulator being provided with switchover means for selectively modifying said corrective voltages in conformity with the characteristics of respective sections.

12. A system as defined in claim 11 wherein said sections include a first section with a substantially symmetrical characteristic and a second section with an asymmetrical characteristic.

* * * * *